Patented June 26, 1928.

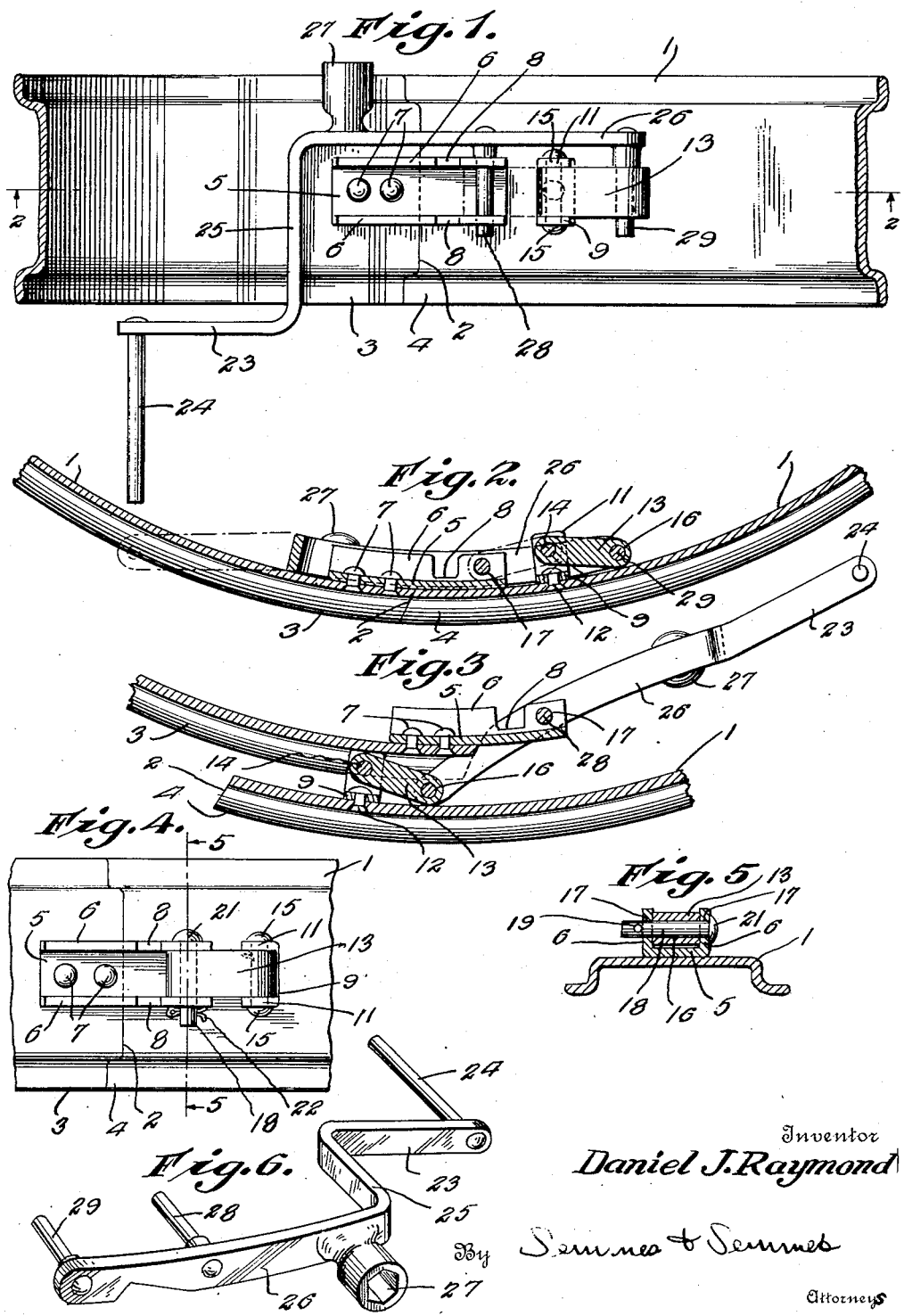

1,674,701

UNITED STATES PATENT OFFICE.

DANIEL J. RAYMOND, OF JACKSON, MICHIGAN.

DEMOUNTABLE RIM.

Application filed May 19, 1923. Serial No. 640,025.

My invention relates to demountable rims, and more particularly to devices of the split rim type.

An object of my invention is to devise a structure in which there is a positive locking effected between the ends of the split rim.

Another object of my invention is to provide a split rim in which the locking means may be utilized in another position for cooperation with a deforming lever to enable the rim to be readily deformed and shrunk.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a plan view of a portion of my split rim with the detachable operating lever in position for deforming the rim, portions of the rim being broken away to more clearly disclose the structure;

Fig. 2 is a longitudinal sectional view of my device taken on the line 2—2 of Fig. 1, looking in the direction of the arrows;

Fig. 3 is a longitudinal sectional view taken through the center of the rim and showing the rim in deformed position with the operating tool in place;

Fig. 4 is a detailed plan view of the locking mechanism for my rim;

Fig. 5 is a cross sectional view taken on the line 5—5 of Fig. 4;

Fig. 6 is a perspective view of the detachable operating lever.

My invention comprises a demountable rim which is preferably split on a plane forming an angle with a plane passing through the axis of rotation of the rim. Mounted upon one side of the split is a support piece which extends over the split, and on the other end of the rim is mounted another support piece. A locking link is pivoted on the last named support piece, and the other end of the locking link is adapted to be held by a bolt passing through a hole in the first named support piece and a hole in the end of the link. The points of pivotal mounting of the link on one support piece and detachable connection of the link with the other support piece are at different distances from the axis of rotation of the rim, whereby the ends of the rim are firmly locked in operative position when an inflated tire is mounted on the rim. The link is so arranged that when not attached to the support piece which extends beyond the split in the rim, it may be rotated to lie in the opposite direction and in contact with the inner periphery of the rim. In this last named position, a detachable operating lever may be pivoted on the overlying support piece and on the free end of the link to deform and shrink the rim.

Referring to the drawings for a more detailed description, I have shown a demountable rim 1 having a transverse split 2 therein preferably formed at an angle to a plane passing through the axis of rotation of the rim. The split 2 divides the rim into rim ends 3 and 4 respectively. Mounted upon the rim end 3 is a U-shaped support piece 5 having upstanding walls 6 which are preferably formed integrally therewith. The support piece 5 is attached to the rim end 3 by means of some suitable fastening means, such as rivets 7. Formed within the upstanding walls 6 of the support piece 5 are apertures or cut away portions 8 which lie adjacent each other and through which may pass one of the bolts of the inner rim (not shown). The bolt co-operates with the cut away portions 8 to prevent the demountable rim 1 from creeping upon the inner rim.

Mounted on the rim end 4 is a U-shaped support piece 9 having upstanding walls 11 which are preferably integrally formed with the support piece. The support piece 9 is firmly attached to the rim end 4 by some suitable means, as a rivet 12. A link 13 is pivoted on a shaft 14 which passes through the upper extremities of the upstanding walls 11, and is held in place by means of riveting the ends, as indicated at points 15.

The link 13 is capable of movement around the shaft 14 as a pivot in either direction, the only limitation to the movement of rotation being the inner periphery of the split rim. The link 13 is provided near its outer end with a hole 16 which passes through the link 13 in a direction substantially parallel to the axis of rotation of the rim.

The upstanding walls 6 of the support piece 5 have near the extremity of that portion of the support piece 5 which overlaps the split 2, oppositely disposed holes 17.

The hole 16 in the link 13 is so positioned with relation to the holes 17 in the upstanding walls 6 of the support piece 5 that in the position of the parts shown in Fig. 4, the hole 16 comes directly opposite and in line with the holes 17, and a bolt 18 can be slid through the holes 17 and the hole 16 to firmly lock the link in place. The bolt 18 is provided with a hole 19 in the end opposite the bolt head 21, and a cotter pin 22 can be inserted therein to firmly hold the bolt 18 in position. It will be noted that the point of pivoting of the link 13, namely the shaft 14, is nearer the axis of rotation of the rim than is the point of attachment of the link 13 to the support piece 5, namely at the position of the holes 17.

By reason of the fact that the point of pivotal mounting of the link 13 is nearer the axis of rotation than the point of attachment of the link 13 to the support piece 5, there is a wedging action secured which firmly holds the ends 3 and 4 of the rim against both lateral and radial displacement. When the tire is mounted on the rim and is blown up, it is exceedingly hard to deform the rim, in other words, to cause the rim end 3 to pass into the position such as is shown in Fig. 3, where the rim end lies within and beyond the rim end 4. When the link is attached to the support piece 5, it is necessary to expand the rim to cause the rim end 3 to move towards the axis of rotation of the rim, since the link 13 will tend to separate the rim end 3 from the rim end 4 in a circumferential direction. The tighter the tire is pumped up, the greater the forces exerted. The support piece 5, of course, prevents radial displacement of the rim ends in the opposite direction.

My demounting tool comprises a lever 23 on one end of which is mounted an operating handle 24. The lever 23 has an angular extension 25 to permit the operating lever to be placed in the operating position and to provide for the handle 24 extending beyond the plane of the rim where it can be easily grasped. The lever 23 has an offset portion 26 substantially parallel thereto and provided with a key socket 27 to remove the bolts that carry the wedges holding the inner fixed rim to the detachable or demountable outer rim. The offset portion 26 is also provided with outstanding pivot arms 28 and 29 firmly attached to the portion 26.

In operation, the cotter pin 22 holding the bolt 18 in place is removed and the link 13 is swung over into the position illustrated in Figs. 1, 2 and 3. The link 13 then has its free end swung over and resting against the inner periphery of the rim 1. The operating lever is then placed in position, as illustrated in Fig. 1 with the outstanding pivot arm 28 passing through the holes 17 formed in the support piece 5, and the outstanding pivot arm 29 passing through the hole 16 in the end of the link 13. By merely swinging over the handle into the position illustrated in Fig. 3, the rim can be readily deformed and shrunk and the tire easily removed. By operating the lever, the rim ends can then be easily brought into the position illustrated in Figs. 1 and 2, and after the lever is removed, the link 13 can be swung over and fastened in place, as illustrated in Fig. 4.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A quickly removable apparatus for carrying tires comprising, a split rim, a channeled support piece fastened to one end of the split rim, a second channeled support piece attached to the other end of the split rim, a link pivoted in the channel of the last named support piece, and means for removably attaching the free end of the link to the first named support piece so that the link may swing out of engagement to operate with a demountable tool.

2. A quickly removable apparatus for carrying tires comprising, a split rim, a U-shaped support piece having up-standing walls having a hole through both walls and fastened to one end of the split rim, a second U-shaped support piece having up-standing walls attached to the other end of the split rim, a link pivoted between the upstanding walls of the last mentioned support piece, and means for removably attaching the free end of the link to the first named support piece, the point of pivotal mounting of the link lying further away from the rim than the point of attachment to the first named support piece, whereby a locking action is effected.

3. A quickly removable apparatus for carrying tires comprising a split rim, a channeled support piece secured to one end of the split rim, the channeled support piece having transverse registering apertures therein, a U-shaped support piece secured to the other end of the split rim, a link pivoted between the arms of the U-shaped support piece, a transverse aperture in the link, and a removable pin adapted to fit through the aperture in the link and the apertures in the channeled support piece, so that the link may swing out of engagement to operate with a demounting tool.

4. A quickly removable apparatus for carrying tires comprising a split rim, a channeled support piece, a transverse slot extending through both walls of the channeled support piece, transverse registering apertures in the free end of the channeled support, the channeled support secured to one end of the split rim and extending beyond the split, a U-shaped support piece attached to the other end of the split rim, a link pivoted between the arms of the U-shaped support piece, a transverse aperture in the free end of the link, a removable pin adapted to fit through the apertures in the free end of the link and the channeled support piece, the pivotal mounting of the link lying further from the rim than its attachment in the channeled support piece, whereby a locking action is effected.

In testimony whereof I affix my signature.

DANIEL J. RAYMOND.